United States Patent
Ren et al.

(10) Patent No.: US 11,075,669 B2
(45) Date of Patent: Jul. 27, 2021

(54) M-ARY DIFFERENTIAL CHAOS SHIFT KEYING METHOD BASED ON CHAOTIC SHAPE-FORMING FILTER

(71) Applicant: Xi'an Univeristy of Technology, Xi'an (CN)

(72) Inventors: Haipeng Ren, Xi'an (CN); Chao Bai, Xi'an (CN); Jie Li, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 16 days.

(21) Appl. No.: 16/658,186

(22) Filed: Oct. 21, 2019

(65) Prior Publication Data
US 2021/0021296 A1  Jan. 21, 2021

(30) Foreign Application Priority Data
Jul. 19, 2019 (CN) .......................... 201910655934.1

(51) Int. Cl.
| | |
|---|---|
| *H04B 1/709* | (2011.01) |
| *H04B 1/7093* | (2011.01) |
| *G06F 17/16* | (2006.01) |
| *H04L 27/00* | (2006.01) |
| *H04L 27/20* | (2006.01) |
| *H04L 27/233* | (2006.01) |

(52) U.S. Cl.
CPC ........... *H04B 1/7093* (2013.01); *G06F 17/16* (2013.01); *H04L 27/001* (2013.01); *H04L 27/2017* (2013.01); *H04L 27/2338* (2013.01)

(58) Field of Classification Search
CPC . H04B 1/7093; H04L 27/001; H04L 27/2017; H04L 27/2338; G06F 17/16
USPC .......................................................... 375/152
See application file for complete search history.

(56) References Cited

U.S. PATENT DOCUMENTS

| 7,593,531 B2 | 9/2009 | Lau et al. | |
|---|---|---|---|
| 2014/0169407 A1* | 6/2014 | Terry | H04B 1/707 |
| | | | 375/141 |

FOREIGN PATENT DOCUMENTS

| CN | 105515683 A | 4/2016 |
|---|---|---|
| CN | 108449297 A | 8/2018 |

OTHER PUBLICATIONS

Kalyani, "Design and Performance Analysis of a New Multiresolution M-ary Differential Chaos Shift Keying Communication System", Proceedings of National Conference on Emerging Trends in VLSI, Embedded and Networking, Apr. 2018, pp. 297-302 (Year: 2018).*

(Continued)

*Primary Examiner* — Kevin M Burd
(74) *Attorney, Agent, or Firm* — Gang Yu (57) ABSTRACT

The present disclosure discloses an M-ary DCSK method based on chaotic shape-forming filtering. The method includes the following steps: at S1, parameters of a communication system are set; at S2, HP information and LP information to be sent in each time slot are prepared; at S3, the information to be sent is modulated; at S4, a chaotic carrier is generated through a chaotic shape-forming filter; at S5, a transmitted signal is prepared; at S6, down-carrier frequency and matched filter is performed to a received signal; at S7, the sampling of a maximum SNR point is performed to an output signal of a matched filter; at S8, the decision of high priority information bits is resumed; and at S9, the decision of low priority information bits is resumed.

5 Claims, 7 Drawing Sheets

(56) References Cited

OTHER PUBLICATIONS

Kaddoum et al "Design and Analysis of a Multi-Carrier Differential Chaos Shift Keying Communication System", IEEE, Jun. 26, 2013, pp. 1-11 (Year: 2013).*

Bai, Chao. "Chaos Impulse Control, Filtering, and It's Application". China Doctoral Dissertations Full-text Database. Jun. 30, 2019 (Jun. 30, 2019). pp. 32-81.

* cited by examiner

M-ARY DIFFERENTIAL CHAOS SHIFT KEYING METHOD BASED ON CHAOTIC SHAPE-FORMING FILTER

CROSS-REFERENCE TO RELATED APPLICATIONS

The present disclosure claims priority of Chinese Patent Application No. 201910655934.1, filed to China Patent Office on Jul. 19, 2019. Contents of the present disclosure are hereby incorporated by reference in entirety of the Chinese Patent Application.

TECHNICAL FIELD

The present disclosure relates to the technical field of Chaotic Spread Spectrum (CSS) Communication, and in particular to an M-ary Differential Chaos Shift Keying (DCSK) method based on chaotic shape-forming filter (CSF).

BACKGROUND

With the increasing popularity of electronic devices like a mobile phone and a tablet PC, the wireless communication technology experiences an exponential growth, and has become a necessary technology in daily life and work. Compared with a good channel environment in wireless communications, a wireless channel is faced with strong noise, narrow bandwidth, low applicable carrier frequency, large transmission delay, severe multi-path attenuation, Doppler frequency shift, and other channel constraints, which makes the reliable wireless communication technology complex and difficult to be implemented. Moreover, with the rapid development of the wireless communications and the exponential increase of communication devices, communication frequency bands face a deteriorating electromagnetic environment, which limits the transmission rate and communication reliability of the wireless communications. Therefore, it is extremely urgent to reinforce the research on the wireless communications and design a higher communication rate and a lower bit error rate under complex channels.

SUMMARY

At least some embodiments of present disclosure provide an M-ary DCSK method based on chaotic shape-forming filter, so as to at least to partially solve a problem of a wireless communication solution in the related art that both a communication rate and a bit error rate have deficiencies in complex channels, and have difficulty to meet requirements.

In an embodiment of the present disclosure, an M-ary DCSK method based on chaotic shape-forming filter is provided, which is implemented according to the following steps.

At step 1, parameters of a communication system are set.

When a signal base frequency of a chaotic shape-forming filter is f, an order of a Walsh code matrix is D, a spreading gain is L, High Priority (HP) information bits and Low Priority (LP) information bits are sent in each transmission time slot. The number of the HP information bits is $l=\log_2 D$, and the number of the LP information bits $N_s=L/D$.

At step 2, bit information to be sent is prepared.

At step 3, the bit information to be sent is modulated.

At step 4, a chaotic carrier is generated through a chaotic shape-forming filter.

At step 5, a transmitted signal is prepared.

At step 6, down-carrier and matched filter is performed to a received signal.

After a signal of a transmitting end is transmitted through a wireless channel, a received signal r(t) of a receiving end is equal to T(t)+w(t). T(t) is a transmitted signal of the transmitting end, and w(t) is channel noise. A down-carrier signal v(t) is obtained by performing digital down-carrier processing to the received signal r(t), and an expression of the v(t) is:

$$v(t)=r(t)\cdot\sin(2\pi f_c t)=(T(t)+w(t))\cdot\sin(2\pi f_c t).$$

The down-carrier signal v(t) is sent to a matched filter to obtain an output signal of the matched filter ξ(t), and the expression of the ξ(t) is:

$$\xi(t) = \sum_{m=\lceil t \rceil - n_s \cdot N_p}^{\lceil t \rceil} v(t) \cdot g(t-m);$$

and t is a system time, v(t) is an input signal of the matched filter, which is also called a digital down-carrier signal, $\lceil t \rceil$ is the smallest integer greater than and equal to the system time t, g(t)=p(−t) is a time inverse function of a chaotic basis function p(t), g(t−m) is an input value of the function g(t) at the moment t−m, and $n_s$ is an oversampling ratio of a chaotic symbol.

At step 7, down-sampling is performed to the output signal of the matched filter.

An output signal ξ(t) of the matched filter is sent to a down-sampling component, the maximum Signal-to-Noise Ratio (SNR) point sampling is performed to the output signal ξ(t) of the matched filter according to an interval t=n/f; and an expression of a maximum SNR sampling point q(n) is:

$$q(n) = \xi\left(\frac{(n-1)}{f} + \frac{1}{2f}\right) \quad 1 \le n \le D \cdot N_s;$$

and $1 \le n \le D \cdot N_s$ is the nth maximum SNR sampling point, and $D \cdot N_s$ maximum SNR sampling points form a maximum SNR sampling sequence, which is expressed as $q=[q(1), q(2), \ldots, q(D \cdot N_s)]$.

At step 8, recovery decision is performed to high priority information bits.

Elements in the maximum SNR sampling point sequence q are respectively multiplied by and added to each row of the Walsh code matrix, and a summing output result of the element $1 \le j \le N_z$ in a row ($1 \le \alpha \le D$) is:

$$A_\alpha(j) = \sum_{k=1}^{D} (q((k-1) \cdot N_s + j) \cdot w_{\alpha,k});$$

An output result of a signal summation component 10 in the row α is:

$$A_\alpha = [A_\alpha(1), A_\alpha(2), \ldots, A_\alpha(N_s)].$$

The output result of the signal summation component is sent to an energy summation component to calculate an energy sum of the row α, and the expression is:

$$E_\alpha = \sum_{j=1}^{N_s} A_\alpha^2(j).$$

The output results of D energy summation components are sent to a maximum likelihood decision component, by comparing the summation results of the D energy summation components, the group with the largest $E_\alpha$ is selected according to a maximum likelihood decision rule. A recovered high priority decimal number is set as $\hat{d}=\alpha$, and the decimal number is recovered to the high priority information bits $\hat{B}_I^{HP}=(\hat{b}_1^{HP}, \hat{b}_2^{HP}, \ldots, \hat{b}_I^{HP})$ according to inverse mapping.

At step 9, the recovery decision is performed to low priority information bits.

The recovered high priority $\hat{d}$ is sent to a selector, a corresponding output result of the signal summation component in the row $\alpha=\hat{d}$ is selected and sent to a symbol decision component, and a low priority bipolar symbol is recovered according to the following formula:

$$\hat{y}_j = \begin{cases} +1, & A_{\hat{d}}(j) > 0 \\ -1, & A_{\hat{d}}(j) \le 0 \end{cases}, 1 \le J \le N_s;$$

A bipolar decision symbol is recovered to unipolar low priority information bits $\hat{B}_{N_s}^{LP}=(\hat{b}_1^{LP}, \hat{b}_2^{LP}, \ldots, \hat{b}_{N_s}^{LP})$ through an S/B transform:

$$\hat{b}_j^{LP} = \begin{cases} 1, & \hat{y}_j = +1 \\ 0, & \hat{y}_j = -1 \end{cases}, 1 \le j \le N_s.$$

The process ends.

The beneficial effects of at least some embodiments of the present disclosure are that: the transmitting end adopts the chaotic shape-forming filter to generated a chaotic spread spectrum carrier as well as providing an extra bit stream for transmission; the receiving end adopts the corresponding matched filter to effectively reduce the effect of noise; the maximum SNR sampling point sampling, the maximum likelihood decision rule, and a soft threshold decoding scheme reduces the effect of multi-path transmission, and effectively improves the communication rate of the scheme and reduces the bit error rate of transmission.

In at least some embodiments of the present disclosure, the orthogonality of the Walsh code matrix is used, and multiple high priority information bits are transmitted once in a transmission time slot.

The chaotic carrier in at least some embodiments of the present disclosure is generated by a special chaotic shape-forming filter, and an extra low priority information bit stream may be transmitted by coding, thereby improving the communication rate of system;

The matched filter adopted by the receiving end in at least some embodiments of the present disclosure may effectively reduce the effects of noise and multi-path, thereby improving the reliability of system.

At least some embodiments of the present disclosure adopts the maximum SNR sampling sequence and the maximum likelihood decision rule, and can still work normally under the low SNR, thereby ensuring the communication reliability of system.

BRIEF DESCRIPTION OF THE DRAWINGS

In the drawings, 1 is a bit-symbol converter, 2 is a Walsh matrix generator, 3 is a binary-decimal converter, 4 is a delay component, 5 is a selection switch, 6 is a chaotic shape-forming filter, 7 is a digital up-carrier component, 8 is a matched filter, 9 is a down-sampling component, 10 is a signal summation component, 11 is an energy summation component, 12 is a maximum likelihood decision component, 13 is a decimal-binary converter, 14 is a digital down-carrier component, 15 is a symbol-bit converter, 16 is a selector, and 17 is a symbol decision component.

DETAILED DESCRIPTION

The present disclosure is elaborated below in combination with the accompanying drawings and the specific implementation modes.

Figure 1:
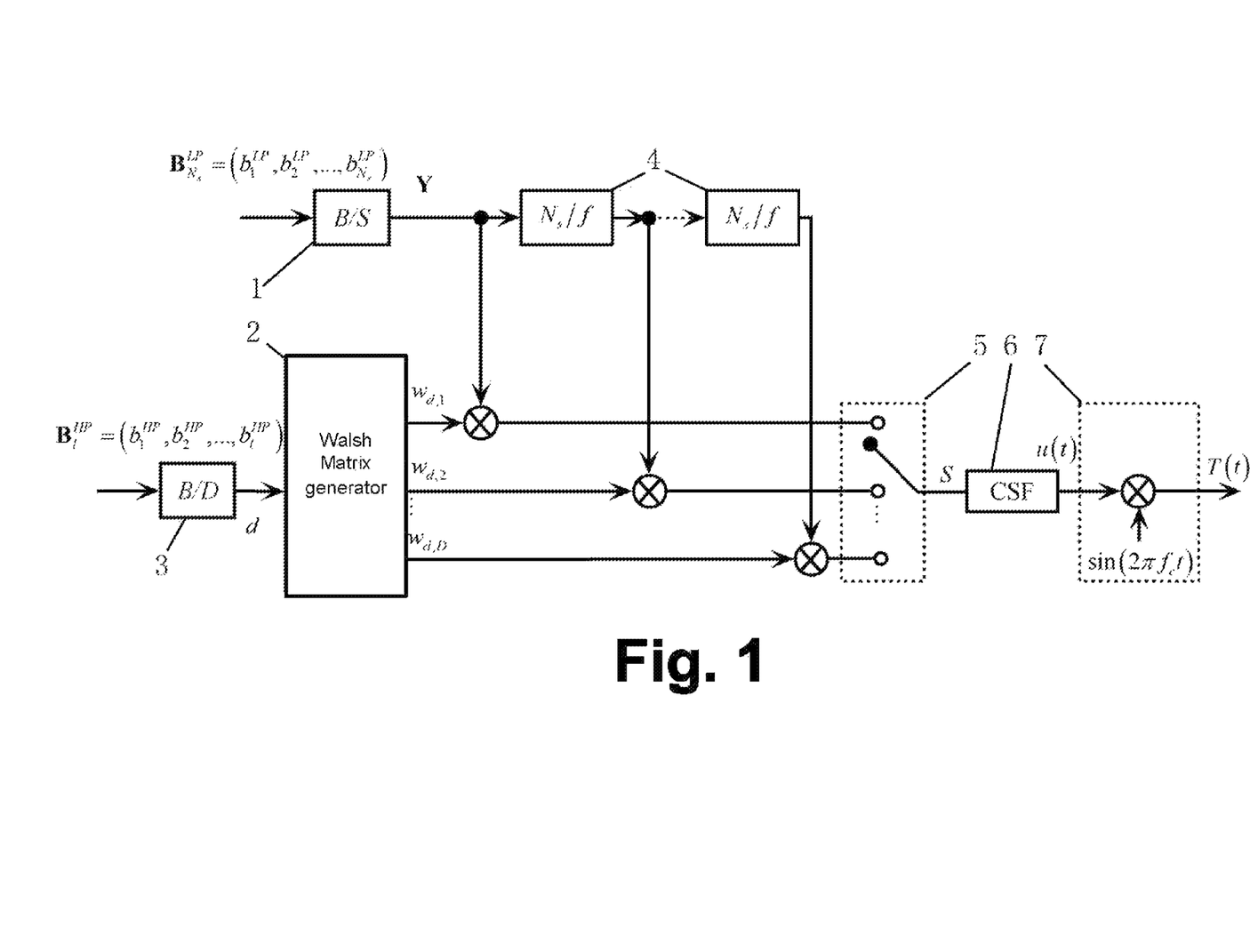
FIG. 1 shows a structure diagram of a transmitting end adopted by a method according to an embodiment of the present disclosure.
Figure 2:
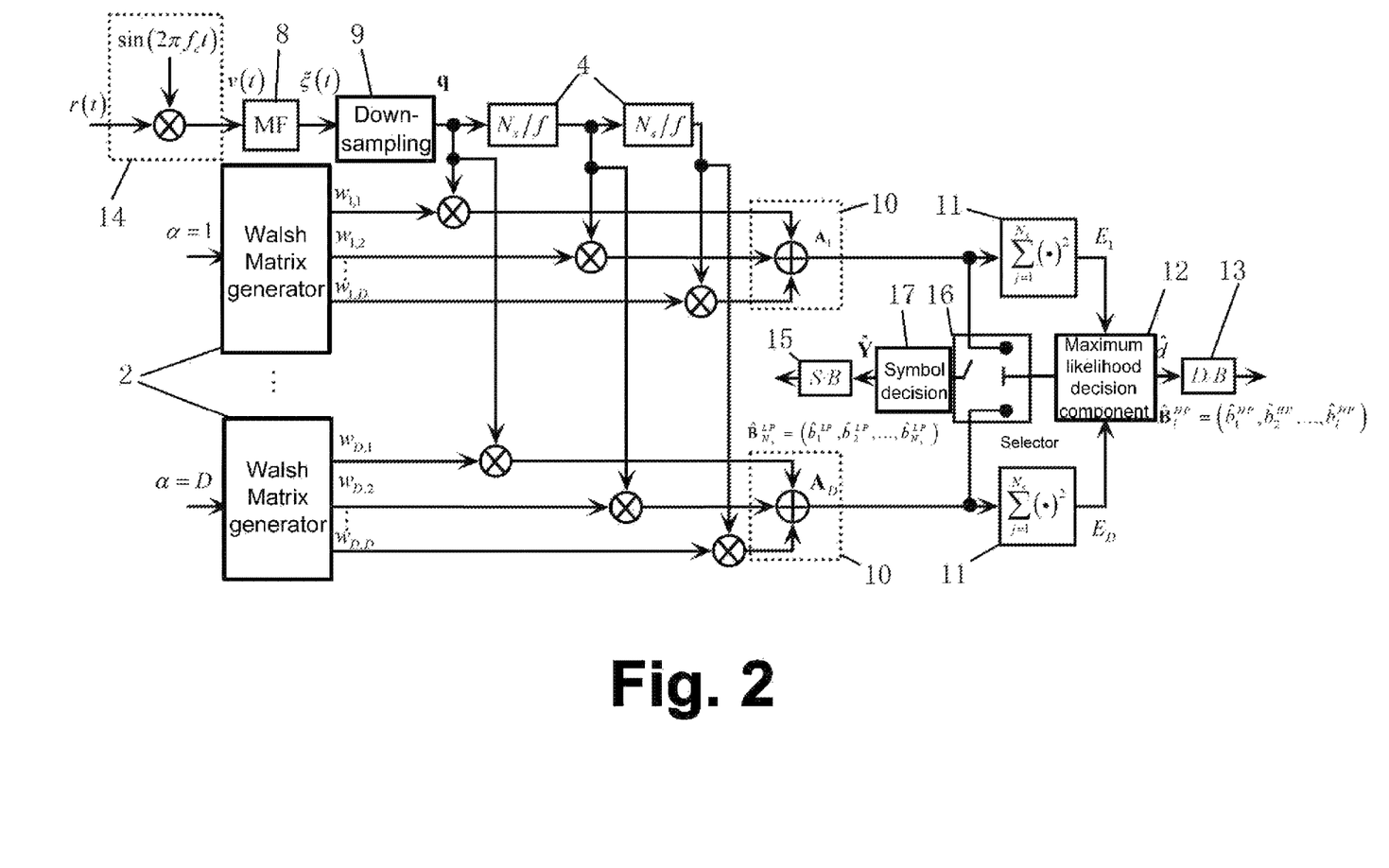
FIG. 2 shows a structure diagram of a receiving end adopted in a method according to an embodiment of the present disclosure.

FIG. 1 and FIG. 2 are respectively system block diagrams of a transmitting end and a receiving end adopted in at least some embodiments of the present disclosure.

As shown in FIG. 1, the structure of the transmitting end includes a bit-symbol converter 1 (which is abbreviated as B/S in the drawing), a Walsh matrix generator 2, a binary-decimal converter 3 (which is abbreviated as B/D in the drawing), a plurality of delay components 4, a plurality of multipliers, a selection switch 5, a chaotic shape-forming filter 6 (which is abbreviated as CSF in the drawing), and a digital up-carrier component 7. An output end of the binary-decimal converter 3 is connected with an input end of the Walsh matrix generator 2. A needed Walsh code matrix is obtained from the Walsh matrix generator 2. The output ends of the bit-symbol converter 1 are respectively connected with the delay components 4. The output end of each delay component 4 and the output end of the Walsh matrix generator 2 are connected with their corresponding multipliers at the same time. All the output ends of the plurality of multipliers are connected with the selection switch 5. The selection switch 5 is connected with the digital up-carrier frequency component 7 through the chaotic shape-forming filter 6. At last, the digital up-carrier component 7 is connected with a wireless channel, so as to transmit the obtained transmitted signal to the wireless channel.

As shown in FIG. 1, the working principle of the transmitting end is that: a symbol sequence Y is obtained after low priority information bits go through the bit-symbol converter 1; at the same time, a decimal number d is output after a plurality of high priority information bits go through the binary-decimal converter 3, and is sent to the Walsh matrix generator 2 to generate the corresponding Walsh code matrix; then, the first element in the Walsh code sequence is multiplied by the symbol sequence Y through the first multiplier, and the second element is multiplied by an output sequence obtained after the symbol sequence Y is transmitted through the delay component 4 once through the second multiplier, and so on; the selection switch 5 selects the corresponding output signals in order from top to bottom to from a transmission symbol sequence S, and then, the transmission symbol sequence S is sent to the chaotic shape-forming filter 6 to obtain a chaotic carrier signal u(t); at last, after the digital up-carrier component 7 multiplies the chaotic carrier signal u(t) by a sine carrier $\sin(2\pi f_c t)$, a transmitted signal is obtained and transmitted to the wireless channel.

As shown in FIG. 2, the structure of the receiving end includes: a digital down-carrier component 14, a matched filter 8 (which is abbreviated as MF in the drawing), a down-sampling component 9 (which is abbreviated as down-sampling in the drawing), a plurality of delay components 4, a plurality of Walsh matrix generators 2, a plurality of signal summation components 10, a plurality of energy summation components 11, a symbol-bit converter 15 (which is abbreviated as S/B in the drawing), a symbol decision component 17 (which is abbreviated as symbol decision in the drawing), a selector 16, a maximum likelihood decision component 12, and a decimal-binary converter 13 (which is abbreviated as DIB in the drawing). The output end of the digital down-carrier component 14 is connected with the down-sampling component 9 through the matched filter 8. The output signal of matched filter is sent to the down-sampling component 9 to perform maximum SNR point sampling. The output ends of the plurality of Walsh matrix generators 2 and the output end of the down-sampling component 9 are connected with the corresponding multiplier at the same time. The output end of each multiplier is connected with its own signal summation component 10. The output end of each signal summation component 10 is connected with the corresponding energy summation component 11. The output end of each energy summation component 11 is connected with the maximum likelihood decision component 12. The maximum likelihood decision component 12 is connected with the decimal/binary converter 13 on one hand, and is connected with the selector 16 on the other hand. The output of the maximum likelihood decision component 12 serves as either the recovery result of a high priority decimal number to recover the high priority information bits through the DIB conversion, or an input signal of the selector 16. The input end of the selector 16 is also connected with the output end of each signal summation component 10. The selector 16 is connected with the symbol-bit converter 15 through the symbol decision component 17. The output result of the selected signal summation component 10 is sent to the symbol decision component 17 to recover the low priority information bits through the S/B conversion.

As shown in FIG. 2, the working principle of the receiving end is that: the received signal r(t) is multiplied by the sine carrier to perform the digital down-carrier, and a down-carrier signal v(t) is sent to the matched filter (MF) 8 to reduce the effect of channel noises; after that, the output signal ξ(t) of the matched filter is sent to the down-sampling component 9 to obtain a maximum SNR sampling sequence q; at the same time, D Walsh matrix generators 2 respectively generate the corresponding Walsh matrix. For any Walsh matrix generator 2, the generated first element is multiplied by the maximum SNR sampling sequence, and the second element is multiplied by the maximum SNR sampling sequence going through the delay component 4, and so on. After that, D multiplication results are first sent to the signal summation component 10, and then sent to the energy summation component 11 to calculate a signal energy sum. When the calculation of D energy sums is completed, the D energy sums are sent to the maximum likelihood decision component 12 to perform energy decision. The one with the largest energy serves as either the recovered high priority decimal number to be recovered to the high priority information bits through the DIB conversion, or the input signal of the selector 16; the corresponding output of the signal summation component 10 is sent to the symbol decision component 17 to recover a lower-priority symbol. At last, the low priority information bits are recovered through the S/B conversion.

Based on a communication system with the transmitting end and the receiving end, the method in an embodiment of the present disclosure is implemented according to the following steps.

At step 1, parameters of the communication system are set.

When a signal base frequency of a chaotic shape-forming filter is f, an order of a Walsh code matrix is D, a spread spectrum gain is L, Higher Priority (HP) information bits and Lower Priority (LP) information bits are sent in each transmission time slot. The number of the HP information bits is $l=\log_2 D$, and the number of the LP information bits $N_s=L/D$ LP.

In an embodiment, if the base frequency of a chaotic signal f is 6 Hz, the order of the Walsh code matrix D is 4, the spreading gain L is 12, then $l=\log_2 D=2$ HP information bits and $N_s=L/D=3$ LP information bits may be sent in each transmission time slot.

At step 2, bit information to be sent is prepared.

HP information $B_l^{HP}=(b_1^{HP}, b_2^{HP}, \ldots, b_l^{HP})$ and LP information $B_{N_s}^{LP}=(b_1^{LP}, b_2^{LP}, \ldots, b_{N_s}^{LP})$ to be sent in each transmission time slot is prepared, and the value of each information bit to be sent is 1 or 0.

Corresponding to the embodiment in FIG. 1, if the 2 HP information bits transmitted are $B_2^{HP}=(0,1)$ and 3 LP information bits transmitted are $B_3^{LP}=(1,0,1)$, each LP information bit period is 1/f, namely ⅙ seconds.

At step 3, the information to be sent is modulated.

1 HP information bits are mapped to a decimal number through the binary-decimal conversion (namely the B/D conversion), and the decimal number is defined as d, and the expression is as follows:

$$d = \left(\sum_{i=1}^{l} b_i^{HP} \cdot 2^{i-1}\right) + 1;$$

and, $d \in \{1, 2, \ldots, D\}$.

A Walsh matrix generator 2 forms a D-order Walsh code matrix $W_{D \times D}$; the Walsh code matrix is composed of "+1" and "−1", any two rows of the matrix are mutually orthogonal, a vector $W_d$ in a row d of the Walsh code matrix is obtained by taking the decimal number d as a row index of the Walsh code matrix, and an expression of the $W_d$ is:

$$W_d = [w_{d,1}, w_{d,2}, \ldots, w_{d,D}];$$

according to $y_j = 2 \cdot b_j^{LP} - 1$, $1 \leq j \leq N_s$, Ns LP information bits are converted to a bipolar symbol (B/S) through the bit-symbol conversion (namely the B/S conversion); the bipolar symbol is defined as Y, and the expression of the Y is:

$$Y = \{y_1, y_2, \ldots, y_j, \ldots, y_{N_s}\};$$

then, an expression of a symbol sequence S to be transmitted is:

$$S = \{w_{d,1} \cdot Y, w_{d,2} \cdot Y, \ldots, w_{d,D} \cdot Y\} = \{[w_{d,1} \cdot y_1, w_{d,1} \cdot y_2, \ldots, w_{d,1} \cdot y_{N_s}], [w_{d,2} \cdot y_1, w_{d,2} \cdot y_2, \ldots, w_{d,2} \cdot y_{N_s}], \ldots, [w_{d,D} \cdot y_1, w_{d,D} \cdot y_2, \ldots, w_{d,D} \cdot y_{N_s}]\}.$$

Corresponding to the above embodiment, I=2 HP information bits $B_2^{HP} = (0,1)$ are mapped to the decimal number through the B/D conversion, then the decimal number d is 3. It can be learned from S1 that if the order D of the Walsh code matrix is 4, then the expression of the Walsh code matrix W generated by the Walsh matrix generator 2 is:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix};$$

then, the vector $W_3$ in the third row of the Walsh code matrix is [1, 1, −1, −1]; after that, $N_s = 3$ LP information bits $B_3^{LP} = (1,0,1)$ are mapped to the bipolar symbol Y which is $\{1, -1, 1\}$, and each element in $W_3$ is multiplied by the bipolar symbol Y to obtain the sequence S of symbols to be transmitted; the expression is:

$$S = \{1 \cdot (1,-1,1), 1 \cdot (1,-1,1), -1 \cdot (1,-1,1), -1 \cdot (1,-1,1)\} = [(1,-1,1), (1,-1,1), (-1,1,-1), (-1,1,-1)].$$

At step 4, a chaotic carrier is generated through a chaotic shape-forming filter 6.

The symbol sequence S to be transmitted is sent to the Chaotic Shape-forming Filter (CSF) 6 to obtain the chaotic carrier signal u(t), and an expression of the u(t) expression is:

$$u(t) = \sum_{m=\lfloor t \rfloor}^{\lfloor t \rfloor + N_p} S_m \cdot p(t-m); \quad (4)$$

and u(t) is the chaotic carrier signal output by the chaotic shape-forming filter 6, t is the system time, $S_m$ is the m(th) element in the symbol sequence S to be transmitted, $\lfloor t \rfloor$ is the largest positive integer less than t, and an expression of a chaotic basis function p(t) is:

$$p(t) = \begin{cases} \left(1 - e^{-\frac{\beta}{f}}\right) e^{\beta t} \left(\cos(\omega t) - \frac{\beta}{\omega} \sin(\omega t)\right), & t < 0 \\ 1 - e^{\beta\left(t - \frac{1}{f}\right)} \left(\cos(\omega t) - \frac{\beta}{\omega} \sin(\omega t)\right), & 0 \leq t < \frac{1}{f} \\ 0, & t \geq \frac{1}{f} \end{cases}$$

and ω and β are the system parameters, satisfying ω=2πf, β=f ln 2, f is a base frequency of a chaotic signal, and $N_p$ is a positive integer of a basis function p(t)≈0 when t≤f·$N_p$.

Figure 3:
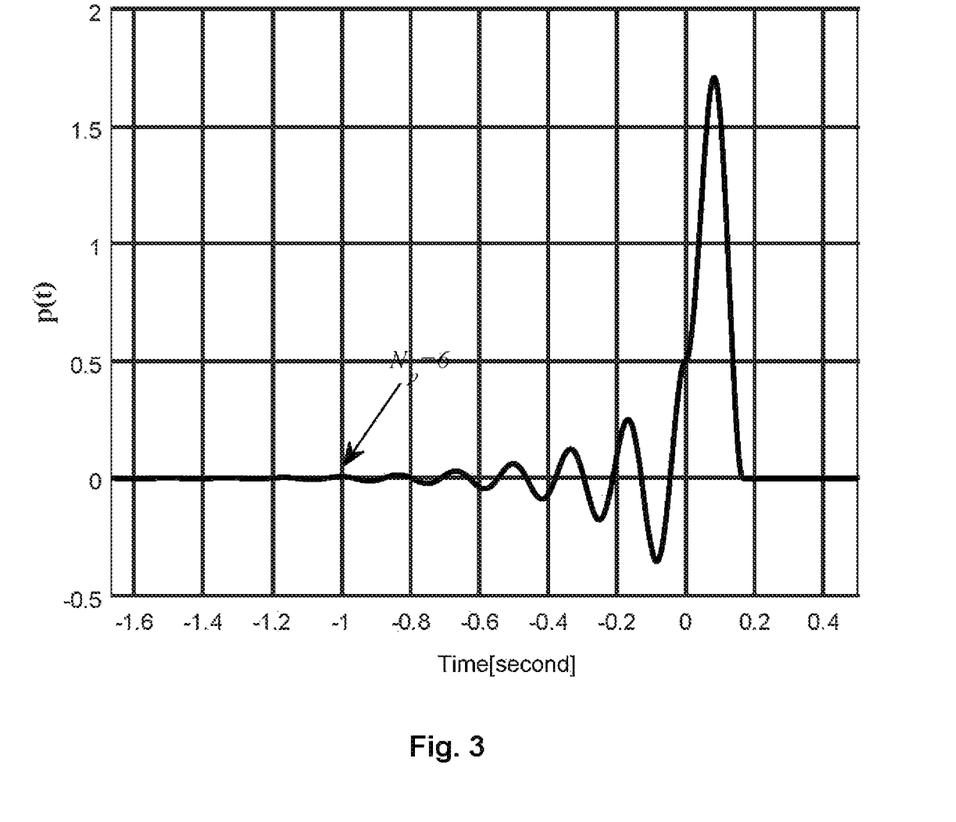
FIG. 3 shows a basis function, adopted in a method according to an embodiment of the present disclosure, of a chaotic system when a base frequency f is equal to 6 Hz.
Figure 4:
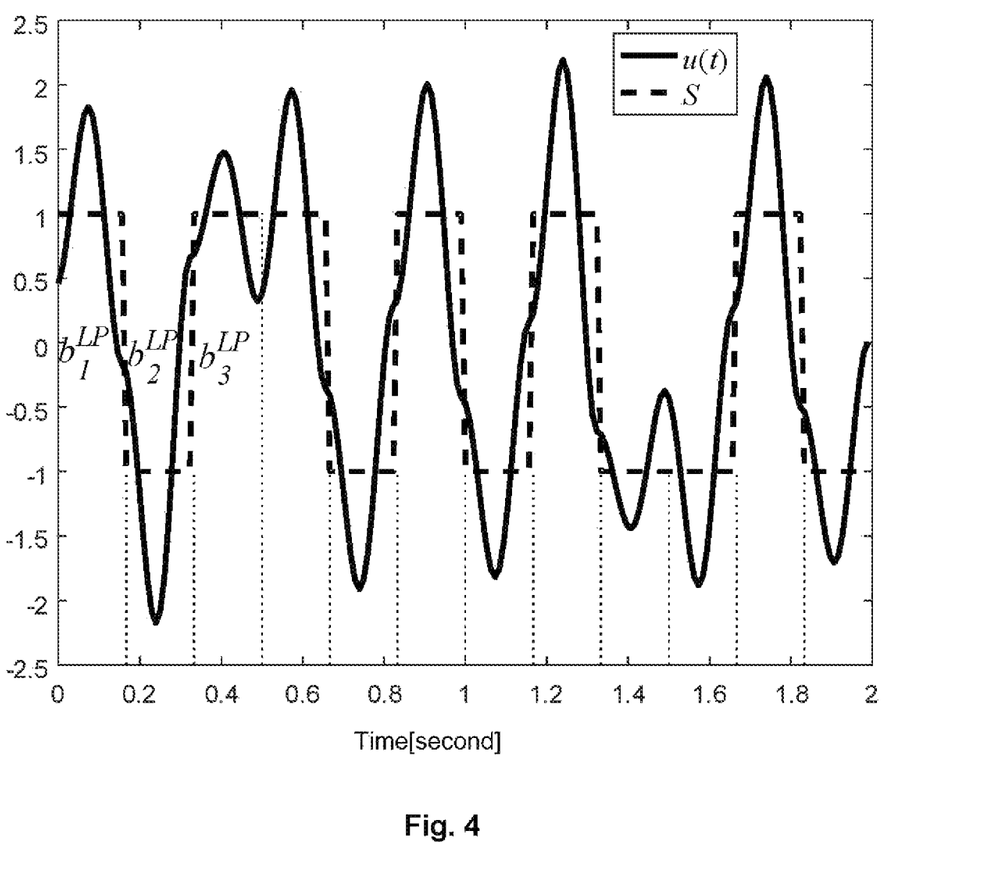
FIG. 4 shows an output signal of chaotic shape-forming filter and the corresponding symbol sequence adopted in a method according to an embodiment of the present disclosure.

Corresponding to the above embodiment, it can be learned from S1 that the base frequency f of the chaotic signal is 6 Hz. FIG. 3 shows a graph of the chaotic basis function when f is equal to 6 Hz. It can be seen that when $N_p = 6$, p(t)≈0 basically meets the requirements. The symbol sequence S to be transmitted, which is equal to [1, −1, 1, 1, −1, 1, −1, 1, −1, −1, 1, −1], obtained at Step 3 is sent to the chaotic shape-forming filter 6, and the obtained chaotic carrier signal is as shown in FIG. 4. The full line in FIG. 4 is the modulated chaotic carrier signal u(t), and the dotted line in FIG. 4 is the corresponding symbol sequence S to be transmitted. It can be seen that each chaotic signal period is 1/f, namely ⅙ seconds, and since the spreading gain L is 12, the sequence S of symbols to be transmitted includes 12 chaotic symbols, and the total duration is 2 seconds.

At step 5, a sending signal is prepared.

Digital up-carrier processing is performed to the chaotic carrier signal u(t) to obtain a channel transmission signal T(t), and an expression of the T(t) is:

$$T(t) = u(t) \cdot \sin(2\pi f_c t);$$

and $f_c$ is the digital up-carrier.

Figure 5:
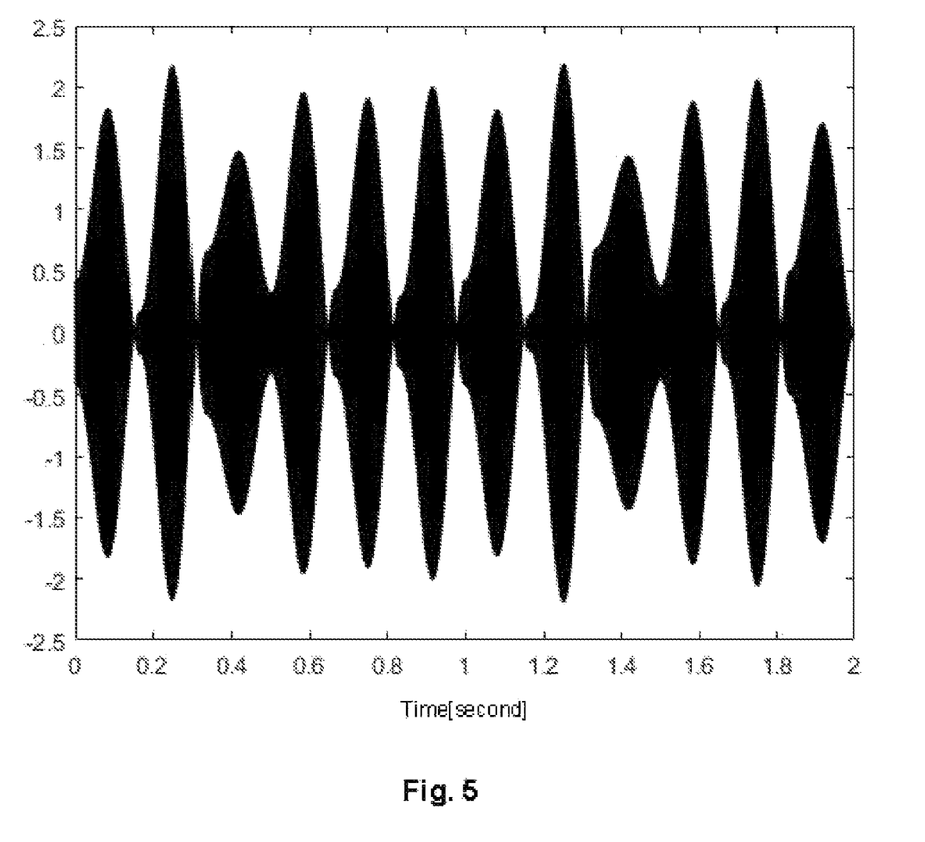
FIG. 5 shows a channel transmission signal adopted in a method according to an embodiment of the present disclosure.

Based on the above embodiment, the chaotic carrier signal u(t) is multiplied by a high-frequency sine signal to perform the digital up-carrier, and the carrier frequency $f_c$ is set to 1000 Hz, then the channel transmission signal T(t) is obtained, as shown in FIG. 5.

At step 6, down-carrier frequency and matched filter is performed to the received signal.

After a signal of a transmitting end is transmitted through the wireless channel, the received signal r(t) of the receiving end is equal to T(t)+w(t), T(t) is the transmitted signal of the transmitting end, and w(t) is channel noise. The down-carrier signal v(t) is obtained by performing the digital down-carrier processing to the received signal r(t), and an expression of the v(t) is:

$$v(t) = r(t) \cdot \sin(2\pi f_c t) = (T(t) + w(t)) \sin(2\pi f_c t).$$

The down-carrier signal v(t) is sent to the matched filter 8 to obtain an output signal ξ(t) of the matched filter, and the expression of the ξ(t) is:

$$\xi(t) = \sum_{m=\lceil t \rceil - n_s \cdot N_p}^{\lceil t \rceil} v(t) \cdot g(t-m);$$

and t is a system time, v(t) is an input signal of the matched filter 8, which is also called the digital down-carrier signal, ⌈C⌉ is the smallest integer greater than and equal to the system time t, g(t)=p(−t) is a time inverse function of the chaotic basis function p(t), g(t−m) is an input value of the function g(t) at the moment t−m, and $n_s$ is an oversampling ratio of the chaotic symbol.

Corresponding to the above embodiment, after the transmitted signal in FIG. 5 is transmitted through a Gauss channel with an Energy per Bit to Noise Power Spectrum Density Ratio ($E_b/N_0$) of 18 dB, the down-carrier signal v(t) is obtained by multiplying the received signal r(t) by the sine signal with the same frequency and phase at Step 5. The output signal of the matched filter obtained by sending the down-carrier signal v(t) to the matched filter 8 is shown by the full line in FIG. 6. An over-sampling rate $n_s$ of the chaotic symbol is 16.

At step 7, down-sampling is performed to an output signal of the matched filter 8.

The output signal ξ(t) of the matched filter is sent to the down-sampling component 9, and the maximum SNR point sampling is performed to the output signal ξ(t) of the matched filter according to an interval t=n/f, and an expression of a maximum SNR sampling point q(n) is:

$$q(n) = \xi\left(\frac{(n-1)}{f} + \frac{1}{2f}\right) \quad 1 \leq n \leq D \cdot N_s;$$

and $1 \leq n \leq D \cdot N_s$ is the nth maximum SNR sampling point, and $D \cdot N_s$ maximum SNR sampling points form a maximum SNR sampling sequence, which is expressed as q=[q(1), q(2), . . . , q(D·N$_s$)].

Figure 6:
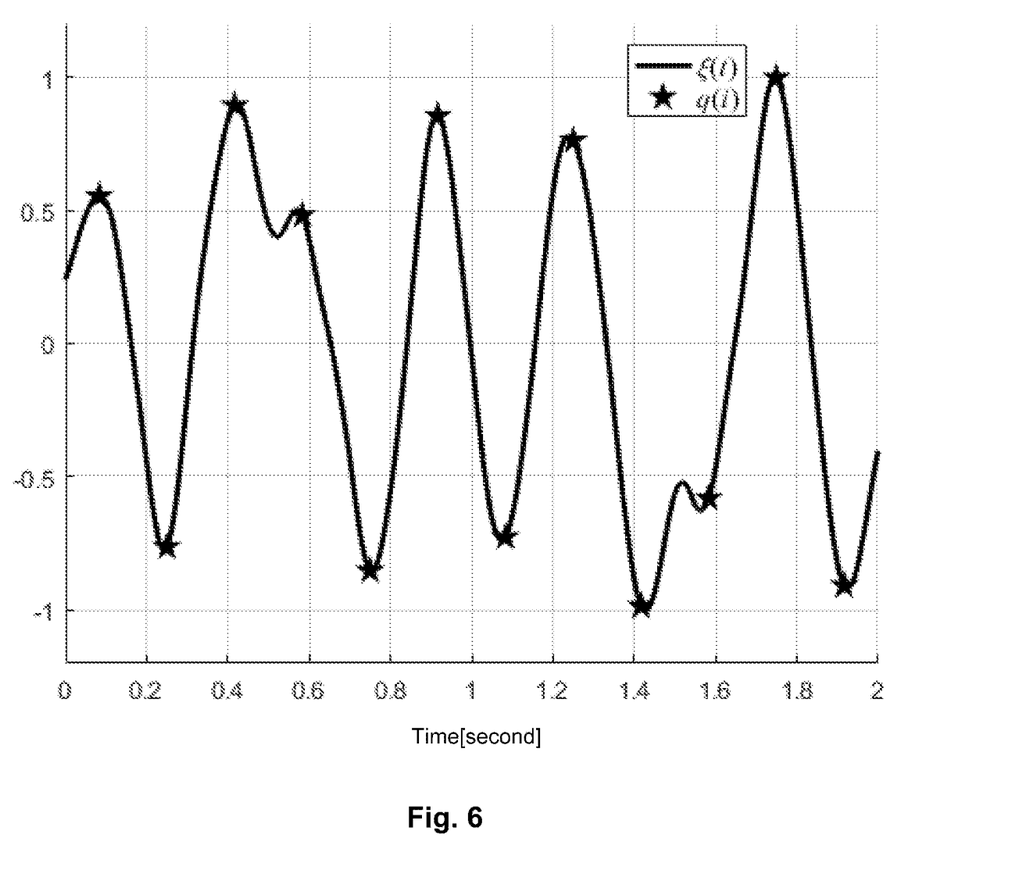
FIG. 6 shows an output signal of the matched filter adopted in a method according to an embodiment of the present disclosure.

Corresponding to the above embodiment, the output signal ξ(t) of the matched filter in FIG. 6 is sampled according to the interval t=n/6(1≤n≤12), and then the maximum SNR sampling sequence q is obtained, where q=[q(1), q(2), . . . , q(12)]=[0.55, −0.76, 0.90, 0.48, −0.85, 0.85, −0.73, 0.76, −0.98, −0.58, 0.99, −0.91], as shown by the black five-pointed star in FIG. 6.

At step 8, recovery decision is performed to the high priority information bits.

The elements in the maximum SNR sampling point sequence q are respectively multiplied by and added to each row of the Walsh code matrix. If the summing output result of the element j(1≤j≤N$_s$) in the row α(1≤α≤D) is:

$$A_\alpha(j) = \sum_{k=1}^{D}(q((k-1) \cdot N_s + j) \cdot w_{\alpha,k});$$

and an output result of a signal summation component 10 in the row α is:

$$A_\alpha = [A_\alpha(1), A_\alpha(2), \ldots, A_\alpha(N_s)].$$

The output result of the signal summation component 10 is sent to the energy summation component 11 to calculate an energy sum of the row α, and the expression is:

$$E_\alpha = \sum_{j=1}^{N_s} A_\alpha^2(j).$$

The output results of D energy summation components 11 are sent to a maximum likelihood decision component 12, by comparing the summation results of the D energy summation components 11, the group with the largest sum of $E_\alpha$ is selected according to a maximum likelihood decision rule. A recovered high priority decimal number is set as $\hat{d}=\alpha$, and the decimal number is recovered to the high priority information bits $\hat{B}_l^{HP}=(\hat{b}_1^{HP},\hat{b}_2^{HP},\ldots,\hat{b}_l^{HP})$ according to inverse mapping.

Corresponding to the above embodiment, by taking α=2 for example, the maximum SNR sampling sequence is equally divided into D=4 groups. Each group N$_s$ is 3 sampling points, namely q=[(0.55, −0.76, 0.90), (0.48, −0.85, 0.85), (−0.73, 0.76, −0.98), (−0.58, 0.99, −0.91)]. The maximum SNR sampling sequence q grouped is multiplied by the W2=[1, −1, 1,−1] in the row $\alpha=^2$ in the Walsh code matrix, namely [1×(0.55, −0.76, 0.90), −1×(0.48, −0.85, 0.85), 1×(−0.73, 0.76, −0.98), −1×(−0.58, 0.99, −0.91)].

After that, 4 groups of sampling point sequences are sent to the signal summation component 10 to obtain 3 output results by calculating, namely:

$$A_2(1) = 1 \times 0.55 + (-1 \times 0.48) + 1 \times (-0.73) + (-1 \times (-0.58)) = -0.08$$

$$A_2(2) = 1 \times (-0.76) + 0 \times (-0.85) + 1 \times 0.76 + (-1 \times 0.99) = -0.14;$$

$$A_2(3) = 1 \times 0.90 + (-1 \times 0.85) + 1 \times (-0.98) + (-1 \times (-0.90)) = -0.02$$

then, the output result of the signal summation component 10 in the row α=2 is A$_2$=[A$_1$,A$_2$,A$_3$]=[−0.08,−0.14,−0.02], and the output result of the energy summation component 11 in the second row is E$_2$=(−0.08)$^2$+(−0.14)$^2$+(−0.02)$^2$=0.026. In the same way, the output results of the energy summation components 11 in the first row, the third row and the fourth row are respectively E$_1$=0.118, E$_3$=30.015 and E$_4$=0.165. The output results of four energy summation components 11 are sent to the maximum likelihood decision component 12, since the third energy summation result E$_3$ is greater than other energy summation results, the recovered high priority symbol $\hat{d}$=3. It can be learned from S3 when $\hat{B}_2^{HP}$=(0,1), $\hat{d}$=3, that is, the recovered HP information bit is (0, 1).

At step 9, the recovery decision is performed to low priority information bits.

The recovered high priority $\hat{d}$ is sent to the selector 16, a corresponding output result of the signal summation component in the row α=$\hat{d}$ is selected and sent to the symbol decision component 17, and a low priority bipolar symbol is recovered according to the following formula:

$$\hat{y}_j = \begin{cases} +1, & A_{\hat{d}}(j) > 0 \\ -1, & A_{\hat{d}}(j) \leq 0 \end{cases}, 1 \leq j \leq N_s.$$

A binary decision symbol is recovered to unipolar low priority information bits $\hat{B}_{N_s}^{LP}=(\hat{b}_1^{LP},\hat{b}_2^{LP}, \ldots \hat{b}_{N_s}^{LP})$ through an S/B transform:

$$\hat{b}_j^{LP} = \begin{cases} 1, & \hat{y}_j = +1 \\ 0, & \hat{y}_j = -1 \end{cases}, 1 \leq j \leq N_s.$$

Corresponding to the above embodiment, it can be learned from Step 8 that the recovered high priority symbol $\hat{d}$=3, and its corresponding signal summation output A$_3$= [2.34,−3.36,3.64]. The recovered low priority bipolar symbols are respectively determined through the threshold 0, namely $\hat{Y}$=(1,−1,1), then the unipolar low priority information bit $\hat{B}_3^{LP}$=(1,0,1) is recovered through the S/B conversion; now, a decoding process ends.

The superiority of the method is verified as follows.

At one, performance under the Gaussian channel is verified.

Figure 7:
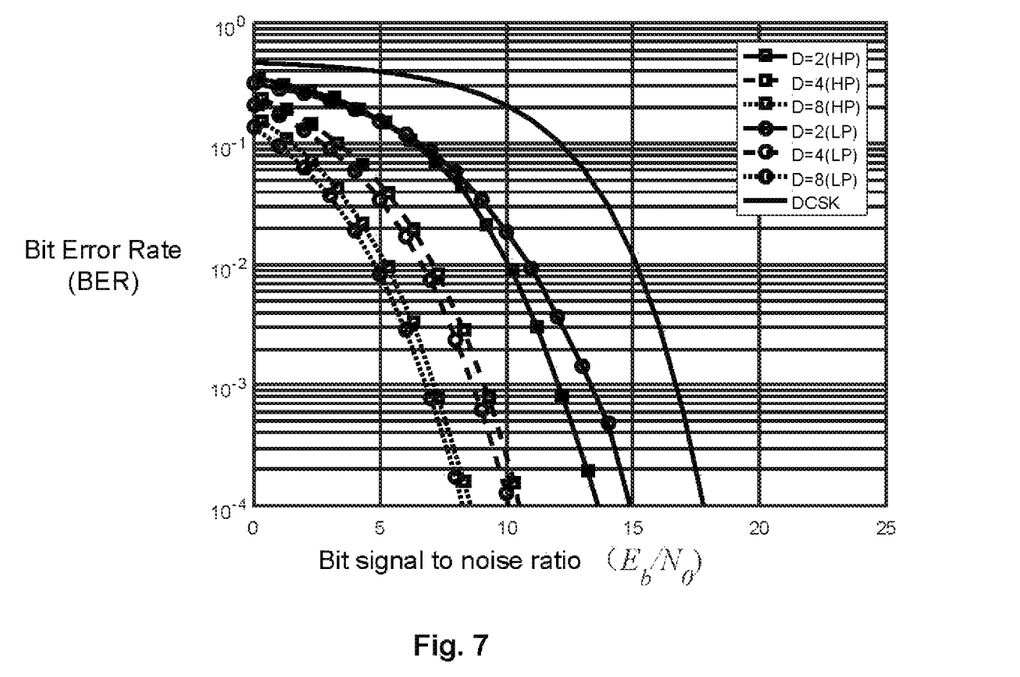
FIG. 7 shows a bit error rate performance under a Gaussian channel adopted in a method according to an embodiment of the present disclosure.

FIG. 7 illustrates a comparison of the bit error rate under the Gaussian channel between the method according to an embodiment of the present disclosure and the DCSK in the classical chaotic communication scheme of the conventional art. In FIG. 7, the block full line, the block dotted line and the block chain line are respectively the bit error bits of the HP information bits in the method of the present disclosure when D=2, 4, 8, L=8, and n$_s$=32; the circle solid line, the circle dotted line and the circle chain line are respectively the bit error bits of the LP information bits in the method of the present disclosure when D=2, 4, 8, L=8, and $n_s$=32; the black solid line is the bit error rate of DCSK when the numbers of the sampling points in the transmission time slot are the same. It can be seen that in the method according to an embodiment of the present disclosure, with the order of the Walsh code matrix increases, the communication rate gradually increases, the bit error rate under the bit SNR shows a declining trend, at the same time, an HP bit error rate is gradually worse than an LP bit error rate. The method according to an embodiment of the present disclosure is obviously better than the DCSK scheme, since the use of the matched filter on the receiving end significantly decreases the effect of noises.

At two, performance under the wireless channel is verified.

Figure 8:
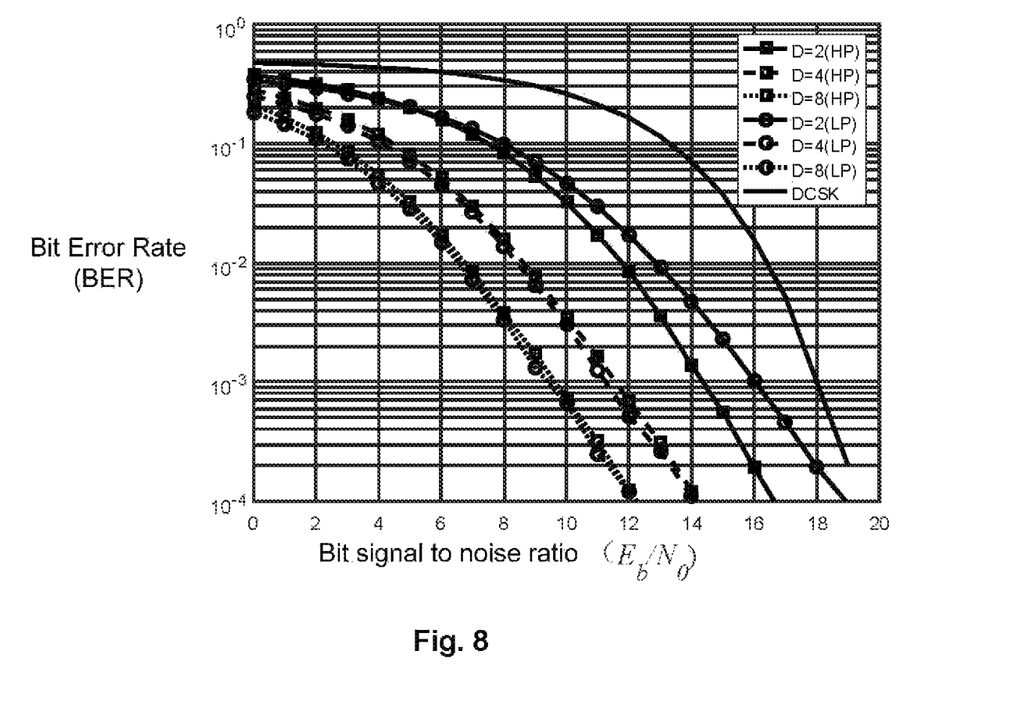
FIG. 8 shows a bit error rate performance under a wireless channel adopted in a method according to an embodiment of the present disclosure.

FIG. 8 illustrates a simulation result under a wireless multi-path attenuation channel. The multi-path attenuation channel is set to three paths; path gains are respectively [0.6, 0.3, 0.1], and the corresponding delay time is respectively [0, 0.010, 0.023] milliseconds. It can be seen from FIG. 8 that the simulation result of the method of the present disclosure presents obvious deterioration compared with the Gaussian channel in the conventional art, but is still better than the DCSK scheme. Due to using the Walsh code matrix, the method of the present disclosure obtains a communication rate better than the DCSK scheme, and the chaotic shape-forming filter is used on the transmitting end, so the transmission of an extra bit stream is obtained, which further improves the communication rate. The receiving end adopts the corresponding matched filter to reduce the effect of noises, and then adopts the maximum SNR sampling sequence in combination with the maximum likelihood decision, thereby reducing the effect of multi-path transmission.

In a word, an M-ary DCSK communication method based on the chaotic shape-forming filter of the present disclosure puts forward using the orthogonality of the Walsh code matrix to transmit an M-ary symbol on the transmitting end, and adopts the special chaotic shape-forming filter, so as to provide the transmission of an extra bit stream. The receiving end does not need the necessary technologies like channel estimation and channel equalization in the classical wireless communication scheme, thereby reducing algorithm complexity and implementation cost; the received signal is transmitted through the designed matched filter, thereby maximizing the SNR of the receiving end; and the information is recovered through the down-sampling and the maximum likelihood decision, thereby reducing the communication bit error rate of the wireless channel.

What is claimed is:

1. An M-ary Differential Chaos Shift Keying (DCSK) method based on chaotic shape-forming filter, comprising:

Step 1, setting parameters of a communication system;

when a signal base frequency of a chaotic shape-forming filter is f, an order of a Walsh code matrix is D, a spreading gain is L, sending High Priority (HP) information bits and Low Priority (LP) information bits in each transmission time slot, wherein the number of the HP information bits is l=$\log_2$ D, and the number of the LP information bits $N_s$=L/D;

Step 2, preparing bit information to be sent;

Step 3, modulating the bit information to be sent;

Step 4, generating a chaotic carrier through a chaotic shape-forming filter;

Step 5, preparing a transmitted signal;

Step 6, performing down-carrier and matched filter to a received signal;

wherein after a signal of a transmitting end is transmitted through a wireless channel, a received signal r(t) of a receiving end is equal to T(t)+w(t), T(t) is the signal of the transmitting end, w(t) is channel noise, a down-carrier signal v(t) is obtained by performing digital down-carrier processing to the received signal r(t), and an expression of the v(t) is:

$$v(t)=r(t)\cdot\sin(2\pi f_c t)=(T(t)+w(t))\cdot\sin(2\pi f_c t);$$

wherein the down-carrier signal v(t) is sent to a matched filter to obtain an output signal ξ(t) of the matched filter, and the expression of the ξ(t) is:

$$\xi(t) = \sum_{m=\lceil t \rceil - n_s \cdot N_p}^{\lceil t \rceil} v(t) \cdot g(t-m);$$

wherein t is a system time, v(t) is an input signal of the matched filter, which is also called a digital down-carrier signal, ⌈t⌉ is the smallest integer greater than and equal to the system time t, g(t)=p(−t) is a time inverse function of a chaotic basis function p(t), g(t−m) is an input value of the function g(t) at the moment t−m, and $n_s$ is an oversampling ratio of a chaotic symbol;

Step 7, performing down-sampling to the output signal of the matched filter;

wherein the output signal ξ(t) of the matched filter is sent to a down-sampling component, the maximum Signal-to-Noise Ratio (SNR) point sampling is performed to the output signal ξ(t) of the matched filter according to an interval t=n/f; and an expression of a maximum SNR sampling point q(n) is:

$$q(n) = \xi\left(\frac{(n-1)}{f} + \frac{1}{2f}\right) \ 1 \leq n \leq D \cdot N_s;$$

wherein 1≤n≤D·$N_s$ is the nth maximum SNR sampling point, and D·$N_s$ maximum SNR sampling points form a maximum SNR sampling sequence, which is expressed as q=[q(1), q(2), . . . , q(D·$N_s$)];

Step 8, performing recovery decision to high priority information bits;

wherein elements in the maximum SNR sampling point sequence q are respectively multiplied by and added to each row of the Walsh code matrix, and a summing output result of the element j(1≤j≤$N_s$) in a row α (1≤α≤D) is:

$$A_\alpha(j) = \sum_{k=1}^{D}(q((k-1)\cdot N_s + j)\cdot w_{\alpha,k});$$

wherein an output result of a signal summation component 10 in the row α is:

$$A_\alpha=[A_\alpha(1),A_\alpha(2), \ldots ,A_\alpha(N_s)];$$

wherein the output result of the signal summation component is sent to an energy summation component to calculate an energy sum of the row α, and the expression is:

$$E_\alpha = \sum_{j=1}^{N_s} A_\alpha^2(j);$$

wherein the output results of D energy summation components are sent to a maximum likelihood decision component, by comparing the summation results of the D energy summation components, the group with the largest sum of $E_\alpha$ is selected according to a maximum likelihood decision rule, a recovered high priority decimal number is set as $\hat{d}=\alpha$, and the decimal number is recovered to the high priority information bits $\hat{B}_l^{HP} = (\hat{b}_1^{HP}, \hat{b}_2^{HP}, \ldots, \hat{b}_l^{HP})$ according to inverse mapping;

Step 9, performing the recovery decision to low priority information bits;

wherein the recovered high priority $\hat{d}$ is sent to a selector, a corresponding output result of the signal summation component in the row $\alpha=\hat{d}$ is selected and sent to a symbol decision component, and a low priority bipolar symbol is recovered according to the following formula:

$$\hat{y}_j = \begin{cases} +1, & A_{\hat{d}}(j) > 0 \\ -1, & A_{\hat{d}}(j) \leq 0 \end{cases}, 1 \leq j \leq N_s;$$

wherein a bipolar decision symbol is recovered to unipolar low priority information bits $\hat{B}_{N_s}^{LP} = (\hat{b}_1^{LP}, \hat{b}_2^{LP}, \ldots, \hat{b}_{N_s}^{LP})$ through an S/B transform:

$$\hat{b}_j^{LP} = \begin{cases} 1, & \hat{y}_j = +1 \\ 0, & \hat{y}_j = -1 \end{cases}, 1 \leq j \leq N_s;$$

Ending.

2. The M-ary DCSK method based on chaotic shape-forming filter as claimed in claim 1, wherein an operation at Step 2 comprises:
preparing HP information $B_l^{HP} = (b_1^{HP}, b_2^{HP}, \ldots, b_l^{HP})$ and LP information $B_{N_s}^{LP} = (b_1^{LP}, b_2^{LP}, \ldots, b_{N_s}^{LP})$ to be sent in each transmission time slot, wherein a value of each information bit to be sent is 1 or 0.

3. The M-ary DCSK method based on chaotic shape-forming filter as claimed in claim 2, wherein an operation at Step 3 comprises:
mapping l HP information bits to a decimal number through a binary-decimal conversion, wherein the decimal number is defined as d, and the expression of the d is as follows:

$$d = \left(\sum_{i=1}^{l} b_i^{HP} \cdot 2^{i-1}\right) + 1;$$

wherein, $d \in \{1, 2, \ldots, D\}$;

forming a D-order Walsh code matrix $W_{D \times D}$ through a Walsh matrix generator, wherein the Walsh code matrix is composed of "+1" and "−1", any two rows of the Walsh code matrix are mutually orthogonal, a vector $W_d$ in a row d of the Walsh code matrix is obtained by taking the decimal number d as a row index of the Walsh code matrix, and an expression of the $W_d$ is:

$$W_d = [w_{d,1}, w_{d,2}, \ldots, w_{d,D}];$$

converting $N_s$ LP information bits to a bipolar symbol through a bit-symbol conversion according to $y_j = 2 \cdot b_j^{LP} - 1$, $1 \leq j \leq N_s$, wherein the bipolar symbol is defined as Y, and the expression of the Y is:

$$Y = \{y_1, y_2, \ldots, y_j, \ldots, y_{N_s}\};$$

and an expression of a symbol sequence S to be transmitted is:

$$S = \{w_{d,1} \cdot Y, w_{d,2} \cdot Y, \ldots, w_{d,D} \cdot Y\} = \{[w_{d,1} \cdot y_1, w_{d,1} \cdot y_2, \ldots, w_{d,1} \cdot y_{N_s}], [w_{d,2} \cdot y_1, w_{d,2} \cdot y_2, \ldots, w_{d,2} \cdot y_{N_s}], \ldots, [w_{d,D} \cdot y_1, w_{d,D} \cdot y_2, \ldots, w_{d,D} \cdot y_{N_s}]\}.$$

4. The M-ary DCSK method based on chaotic shape-forming filter as claimed in claim 3, wherein an operation at Step 4 comprises:
transmitting the symbol sequence S to be transmitted to the chaotic shape-forming filter to obtain a chaotic carrier signal u(t), and an expression of the u(t) is:

$$u(t) = \sum_{m=\lfloor t \rfloor}^{\lfloor t \rfloor + N_p} S_m \cdot p(t-m);$$

wherein u(t) is the chaotic carrier signal output by the chaotic shape-forming filter, t is the system time, $S_m$ is the m(th) element in the symbol sequence S to be transmitted, $\lceil t \rceil$ is the largest positive integer less than t, and an expression of a chaotic basis function p(t) is:

$$p(t) = \begin{cases} \left(1 - e^{-\frac{\beta}{f}}\right) e^{\beta t} \left(\cos(\omega t) - \frac{\beta}{\omega} \sin(\omega t)\right), & t < 0 \\ 1 - e^{\beta\left(t-\frac{1}{f}\right)} \left(\cos(\omega t) - \frac{\beta}{\omega} \sin(\omega t)\right), & 0 \leq t < \frac{1}{f} \\ 0, & t \geq \frac{1}{f} \end{cases}$$

wherein $\omega$ and $\beta$ are the system parameters, satisfying $\omega = 2\pi f$, $\beta = f \ln 2$, f is a base frequency of a chaotic signal, and $N_p$ is a positive integer of a basis function $p(t) \approx 0$ when $t \leq f \cdot N_p$.

5. The M-ary DCSK method based on chaotic shape-forming filter as claimed in claim 4, wherein an operation at Step 5 comprises:
performing digital up-carrier processing to the chaotic carrier signal u(t) to obtain a channel transmission signal T(t), and an expression of the T(t) is:

$$T(t) = u(t) \cdot \sin(2\pi f_c t);$$

wherein $f_c$ is a digital up-carrier frequency.

* * * * *